US012718600B2

(12) United States Patent
Sonnleitner et al.

(10) Patent No.: US 12,718,600 B2
(45) Date of Patent: Aug. 25, 2026

(54) SYSTEM FOR CHECKING THE AUTHENTICITY OF PRODUCTS

(71) Applicant: Red Bull GmbH, Fuschl am See (AT)

(72) Inventors: Hermann Sonnleitner, St. Peter (AT); Josef Nachbagauer, Fuschl am See (AT); Roland Concin, Fuschl am See (AT); Harald Mayrhuber, Fuschl am See (AT)

(73) Assignee: Red Bull GmbH, Fuschl am See (AT)

(*) Notice: Subject to any disclaimer, the term of this patent is extended or adjusted under 35 U.S.C. 154(b) by 426 days.

(21) Appl. No.: 18/258,975

(22) PCT Filed: Dec. 23, 2021

(86) PCT No.: PCT/EP2021/087482
§ 371 (c)(1),
(2) Date: Jun. 22, 2023

(87) PCT Pub. No.: WO2022/136639
PCT Pub. Date: Jun. 30, 2022

(65) Prior Publication Data

US 2024/0062561 A1 Feb. 22, 2024

(30) Foreign Application Priority Data

Dec. 23, 2020 (EP) .................................... 20216867

(51) Int. Cl.
*G06V 20/68* (2022.01)
*F25D 27/00* (2006.01)
*G06Q 30/018* (2023.01)

(52) U.S. Cl.
CPC ............. *G06V 20/68* (2022.01); *F25D 27/00* (2013.01); *G06Q 30/018* (2013.01); *F25D 2700/06* (2013.01)

(58) Field of Classification Search
CPC ... F25D 2700/06; F25D 27/00; G06Q 30/018; G06V 20/68
See application file for complete search history.

(56) References Cited

U.S. PATENT DOCUMENTS 3,039,583 A 6/1962 Menefee
9,308,149 B1 4/2016 Niskey et al.
9,548,863 B2 1/2017 Weiss
9,784,497 B2 10/2017 Wang et al.
9,965,798 B1 5/2018 Vaananen
10,132,547 B2 11/2018 Grimminger et al.
10,401,546 B2* 9/2019 Craven-Bartle ........ G06F 3/042
10,891,726 B2 1/2021 Weiss et al.
11,030,501 B2 6/2021 Weiss et al.
11,143,450 B2 10/2021 Sumihiro et al.
2003/0006281 A1* 1/2003 Thomas ............... G06Q 20/203 705/28
2010/0007464 A1* 1/2010 McTigue ............. G06Q 10/087 340/10.1
2010/0275625 A1* 11/2010 Lowenstein ........... G16H 40/67 62/127
2014/0316951 A1* 10/2014 Rimnac .................. G06F 16/58 705/28
2015/0041616 A1 2/2015 Gentile et al.
2016/0047587 A1 2/2016 Sasaki et al.
2016/0138782 A1 5/2016 Sckenkl et al.
2016/0182864 A1* 6/2016 Izawa ................ H04N 1/00347 348/143
2017/0219276 A1 8/2017 Wang et al.
2017/0262973 A1 9/2017 Johnston
2017/0286974 A1 10/2017 Weiss et al.
2018/0031310 A1 2/2018 Kendall et al.
2018/0137462 A1 5/2018 Zohar et al.
2018/0245840 A1 8/2018 Chen et al.
2019/0043059 A1 2/2019 Xie et al.
2019/0226755 A1 7/2019 Johnston
2019/0250107 A1* 8/2019 Sreenivasan ....... G01N 21/8851
2021/0240864 A1 8/2021 Weiss et al.
2021/0342427 A1 11/2021 Popov et al.
2022/0076237 A1 3/2022 Huhtasalo

FOREIGN PATENT DOCUMENTS

| | | | |
|---|---|---|---|
| CN | 103604271 | A | 2/2014 |
| CN | 105758108 | A | 7/2016 |
| CN | 106247752 | A | 12/2016 |
| CN | 106642976 | A | 5/2017 |
| CN | 106642981 | A | 5/2017 |
| CN | 104361041 | B | 12/2017 |
| CN | 206817873 | U | 12/2017 |
| CN | 109114877 | A | 1/2019 |
| CN | 109171321 | A | 1/2019 |
| CN | 208704296 | U | 4/2019 |
| CN | 211375451 | U | 8/2020 |
| CN | 111698394 | A | 9/2020 |
| CN | 111698395 | A | 9/2020 |
| DE | 102018103135 | A1 | 8/2019 |
| EP | 2862131 | A1 | 4/2015 |

(Continued)

OTHER PUBLICATIONS

European Patent Office, International Search Report and Written Opinion of the International Searching Authority in PCT/EP2021/087482, mailed Feb. 24, 2022, 17 pages.

*Primary Examiner* — John R Wallace
(74) *Attorney, Agent, or Firm* — Miller Nash LLP

(57) ABSTRACT

A system for checking the authenticity of a product, according to which the product is provided with an identification, the information of which is read out by a detector and is transmitted to a database via an information network and is compared with information stored there, wherein a decision regarding the authenticity or inauthenticity of the product is generated as a result of the comparison and the result of this decision is signaled at the location of the product. The product is a packaged foodstuff and the detector is arranged in a refrigerator in which the product is placed. The invention also relates to a system for optically identifying from above products on a transparent shelf surface.

18 Claims, 4 Drawing Sheets

(56) References Cited

FOREIGN PATENT DOCUMENTS

| | | | |
|---|---|---|---|
| EP | 2894596 | A1 | 7/2015 |
| EP | 2975343 | A1 | 1/2016 |
| EP | 2975344 | A1 | 1/2016 |
| EP | 2990988 | A1 | 3/2016 |
| EP | 3154015 | A1 | 4/2017 |
| EP | 3179441 | A1 | 6/2017 |
| EP | 3189465 | A1 | 7/2017 |
| EP | 3510527 | A1 | 7/2019 |
| EP | 3564840 | A1 | 11/2019 |
| JP | 2001208463 | A | 8/2001 |
| JP | 2002318060 | A | 10/2002 |
| JP | 2019086282 | A | 6/2019 |
| JP | 2019095829 | A | 6/2019 |
| JP | 2020056574 | A | 4/2020 |
| KR | 20200110026 | A | 9/2020 |
| SE | 1851627 | A1 | 6/2020 |
| TW | 201816737 | A | 5/2018 |
| WO | 03005295 | A1 | 1/2003 |
| WO | 2013188897 | A1 | 12/2013 |
| WO | 2015024841 | A1 | 2/2015 |
| WO | 2018142022 | A1 | 8/2018 |
| WO | 2020149454 | A1 | 7/2020 |
| WO | 2022132806 | A1 | 6/2022 |

* cited by examiner

18

21

19

SYSTEM FOR CHECKING THE AUTHENTICITY OF PRODUCTS

RELATED APPLICATIONS

This application is a national stage under 35 U.S.C. § 371 of International Application No. PCT/EP2021/087482, filed Dec. 23, 2021, which claims priority of European Patent Application No. 20216867.0, filed Dec. 23, 2020.

TECHNICAL FIELD

The field of the present disclosure relates to a system for checking the authenticity of products.

BACKGROUND

Particularly in the case of products which are passed on from an initial supplier in several stages from the respective suppliers to the respective buyers, there is a desire on the part of all those legally involved to be able to check whether the product currently on hand actually originates from the initial supplier indicated and is not a counterfeit. Conventionally, products—especially product packaging—are equipped with at least one additional feature that is not conspicuous, but whose presence can be verified by those in the know, and which, if possible, is not easy to copy.

For several years now, more and more procedures have been proposed in which electronic data processing is used for checking the authenticity, often in combination with digital data transmission via a data transmission network. Here are several examples:

According to EP 2862131 A1, a good is provided with two identification features, one of which is obviously readable (e.g., a QR code) and the second feature is a non-obviously readable but unique feature, e.g., a color jumble, in which the ultimately significant information lies in the arrangement of a few color dots in a narrow, inconspicuous color spectrum and must be read from a special viewing angle. The features are read by means of a special reader. To prove the authenticity of the goods, the information obtained from the obviously readable feature must match the correctly read information from the non-obviously readable feature.

In EP 2894596 A1 it is proposed to provide goods (or goods packaging) with a unique identification feature, which is registered in a database, and to provide mobile devices (e.g., smartphones), through which the identification feature can be read on the goods and transmitted to the database along with information about the geographical location where the reading takes place. The data regarding the location of the product at the relevant time is recorded in the database, and on the basis of information stored in the database regarding the identification feature, it is verified whether the indicated location of reading is plausible for the relevant product or not, and accordingly concluded whether the product is genuine or not.

According to the documents EP 2990988 A1, EP 3154015 A1, EP 3179441 A1, EP 3189465 A1 EP 3510527 A1, EP 3564840 A1, a good is provided with (at least) two readable features each, one feature being obvious and obviously readable, and the second feature non-obviously readable and possibly not readily noticeable, and wherein the information from both features is stored in a database as belonging together. To verify a good, the two pieces of information detected by a reader are transmitted to the database and the database reports back whether the two pieces of information belong together, which means that the article is genuine, or whether it is not.

The disadvantage of the authenticity verification methods proposed so far, which use readable identifications and electronic data processing, is that they require individual human-initiated verification processes and the handling of separate readers. The level of effort involved ultimately means that verification procedures are only really applied to a disturbingly small proportion of goods as an effective means of combating product counterfeiting.

JP 2001208463 A publicly proposed, as early as 2001, to equip a refrigerator with electronic cameras for its interior, as well as software and data network connections to identify the goods stored in the refrigerator from the images captured by the cameras through automated image recognition and to provide this information automatically to an authorized person, who may be located far away, so that he or she knows what to buy or what can be cooked.

Following on from JP 2001208463 A, there are a large number of patent publications which build on the same basic idea and delve into sub-topics relating to it, such as arrangements of the cameras, obtaining the background knowledge for identification, details of image processing, preparation of suggestions for use of the content ("dietary advice"), freshness warnings, etc. By way of example, reference is made to CN 103604271 A, CN 104361041 B, CN 105758108 A, CN 106247752 A, CN 106642976 A, CN 106642981 A, CN 109114877 A, CN 206817873 U, CN 208704296 U, TW 201816737 A, US 20180245840 A1, US 20190226755 A1, U.S. Pat. No. 9,784,497 B2, WO 2015024841 A1 and WO 2018142022 A1.

For the manufacturers and suppliers of goods with which a refrigerator equipped in such a way is to be filled, the topic of "automatic creation and provision of information about the contents of a refrigerator" has so far remained without benefit. Apparently, the specialists who develop such refrigerators have always focused only on those market participants who consume goods to be cooled, and not also on those who offer these goods.

The present inventors have recognized that it is desirable to reduce the additional effort required by buyers of products when they want to check the authenticity of products. Furthermore, an authenticity check may be carried out for a higher proportion of products arriving at customers than is currently the case, and information about the position of the product at the respective time may be transmitted to authorized suppliers or manufacturers.

SUMMARY

A proposed solution is limited to packaged foodstuffs which are to be stored in refrigerators. The solution is triggered by the combination of the findings that the achievable knowledge gain is particularly valuable for such products, and that the technical implementation of the solution is surprisingly simple.

According to the present disclosure, it is proposed that the means required on site for checking the authenticity of the products and the means required on site for obtaining the information about the products to be transmitted to a database (—of the supplier of the goods-) be placed in those refrigerators in which the products are to be stored, and that the procedural steps to be carried out on site for the aforementioned purposes also be carried out automatically in the refrigerator. ("In the refrigerator" in this context means that the said means are part of that device which also includes the refrigerating room for the products and the aggregates for refrigeration).

A particular advantage of the proposed solution is that the means for realization are predominantly already present in those known refrigerators which automatically inform the refrigerator users about the refrigerator contents. This means that very little additional effort is required to use these refrigerators in accordance with the embodiments disclosed herein, and existing developments and know-how can be built upon to a large extent.

BRIEF DESCRIPTION OF THE DRAWINGS

The invention is illustrated and explained in more detail by means of stylized drawings of exemplary embodiments.

DETAILED DESCRIPTION

A system for checking the authenticity of a product may comprise a refrigerator, a product provided with an identification, a detector arranged in the refrigerator for detecting the identification, and one or more databases containing information about the product.

Figure 1:
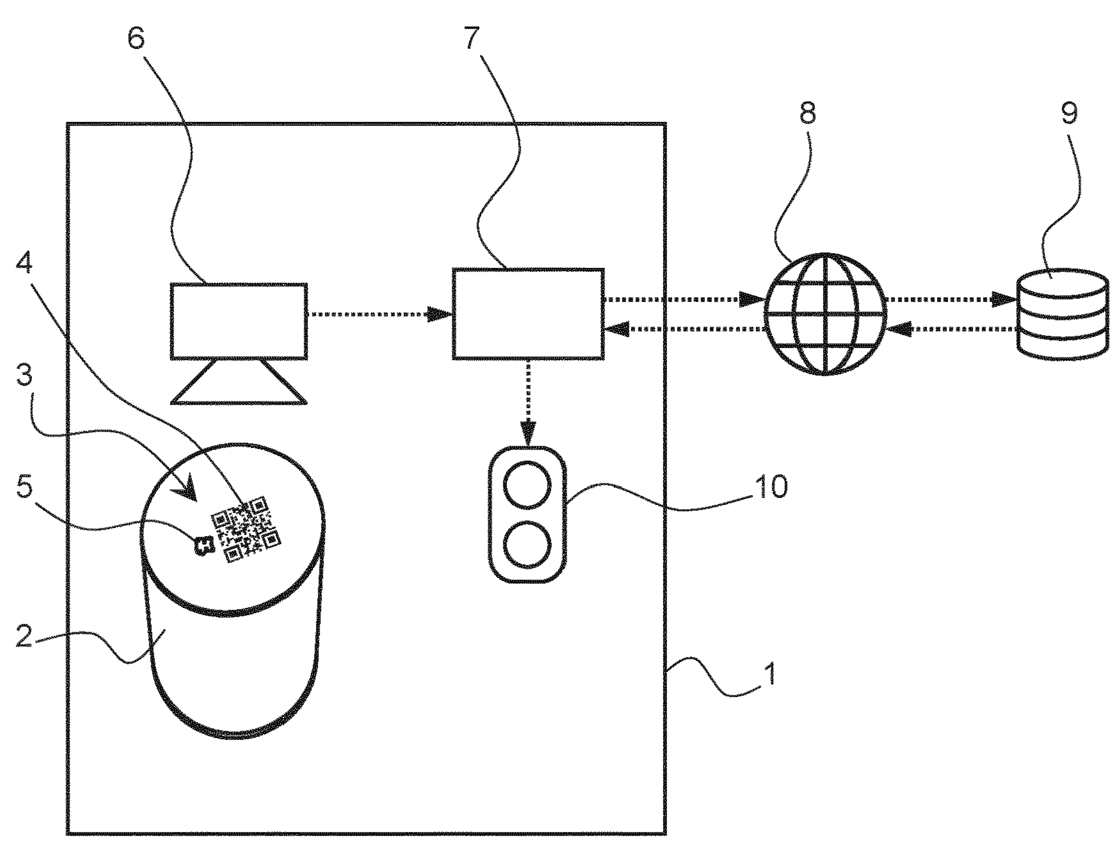
FIG. 1: is a schematic representation of elements of a system for checking products according an embodiment.

FIG. 1 symbolizes, among other things, a refrigerator 1 in cooling area of which a product 2 is located, which typically consists of a foodstuff and a package enclosing it. The product 2 is provided with an identification 3, which exemplarily consists of an obvious identification element 4 (typically a QR code) and an encrypted identification element 5.

The identification 3 is applied to the product 2. The application of the identification can, for example, take place during the production process.

The product 2 may typically be a beverage can and the refrigerator 1 may typically be located in a location which end users may obtain the product 2 from.

In the refrigerator 1, there is also a detector 6—typically a camera—which is able to detect those physical properties which signify the relevant information of the identification 3.

In or on the refrigerator 1, there is a local control and communication unit 7 which receives the information detected by the detector 6 and transmits it along with identification information for the control and communication unit 7 itself, in the form of digital data, via an information network 8 to a database 9 which may also be located far away from the refrigerator 1.

The information network 8 is typically the Internet which in this description also includes the required local access nodes. The owner of the database 9 is typically a central institution located high up in the supply chain for the product 2, such as the manufacturer of the product 2 or a wholesaler for the product 2.

The database 9 has been fed with data concerning the individual units of the product 2 (e.g., the individual beverage cans) from central points of the supply chain to subsequent points of the supply chain at the latest when the product 2 is delivered. A data record concerning the product 2 contains at least information about the type of product and the information readable from the identification 3 on the product packaging, preferably also information about times of production and delivery and about the distribution channel.

After the database 9 has received from an individual control and communication unit 7 an identifying information read from an identification 3 on a product 2, it compares this information with any information already available on the identifying information received and transmits information by which the authenticity of the product 2 is either confirmed or denied back to the communication unit 7 via the information network 8.

In detail, as is known—and as mentioned at the outset by way of example on the basis of the prior art—there are many different known methods for authenticity checking. According to the optional example outlined in FIG. 1, the identification 3 comprises an obvious—i.e., one that can be easily recognized and also easily forged—identification element 4 and an encrypted identification element 5, whereby the encrypted identification element 5 is difficult to forge and for which it is usually not even clear to outsiders in which physical properties the relevant identification information resides. In the database 9, the content of the obvious identification element 4 and the content of the encrypted identification element 5 are stored as belonging together. If, from the information transmitted from the control and communication unit 7 to the database 9, it can be seen by the database 9 that the contents of the apparent identification element 4 and the contents of the encrypted identification element 5 correspond to related contents of a stored data record, this is an indication of the authenticity of the product 2, so that the authenticity can be confirmed. In the opposite case, this is an indication that the product 2 is a counterfeit. In addition to confirming or denying authenticity at the location of the product, a benefit is generated by storing in the database 9 from which control and communication unit 7—and thus from which refrigerator 1—the presence of a particular product 2 is reported. This makes it possible to monitor when which products 2 arrive where and when they leave from there. This information, which is created as a side effect with practically no additional effort, is very valuable for controlling and optimizing logistics and distribution structures.

After the information originating from the database 9 and confirming the authenticity of the product 2 has arrived at the control and communication unit 7 in or on the refrigerator 1, the control and communication unit 7 accordingly switches a signal element 10 located in or on the refrigerator 1 to "Authenticity confirmed" or, for example, "Authenticity cannot be confirmed". In a simple case, this signaling can be done by a green or red light.

Optionally, the signal element 10 can also be equipped with more display functions—for example by being executed as a screen—and can serve to output further information, typically background information stored for the product 2 in the database 9 and received via the control and communication unit 7. As explained in more detail below, this background information could possibly also include product defects detected elsewhere or information on a product recall.

According to the present disclosure the detector 6 required for the confirmation of authenticity at the location of the product 2 concerned is arranged in the refrigerator 1 in which the product 2 is in any case temporarily stored on its way to ultimate consumption. It is particularly advantageous if the detector 6 is arranged in the refrigerator in such a way that it can already detect the identifications 3 when the products 2 are placed in the refrigerator as usual, so that no separate work step is required on the part of persons.

A particularly high value of the present disclosure results when the database 9, in which identification 3 of a product 2 is used for authenticity checking, is additionally used to store further data on the product. Ideally, the identification 3 relates to exactly one individual product, i.e., for example, to exactly one beverage can and not to all beverage cans of an entire production batch or even to all beverage cans which are intended to be of the same design and filled in the same way. However, there are also considerable advantages if the information shown in an identification 3 applies not only to a single individual product but also, for example, to all products which can be assigned to the same production batch, so that it can be assumed that the individual process steps have been carried out "exactly" in the same way for all individual products of the production batch concerned.

Taking the example that each individual piece of the products 2 has an individual identification 3 (according to FIG. 1), the database 9 according to an advantageous embodiment can have data records which always relate to exactly one individual product (i.e., exactly one single beverage can, for example), wherein the data records each contain the following information, for example:

Content of the obvious identification element 4

Content of the encrypted identification element 3

Time, equipment identification, key operating parameters during surface coating on the inside of the packaging.

Time, equipment identification, key operating parameters during surface coating on the outside of the packaging.

Time, equipment identification, key operating parameters when filling the package.

Time, equipment identification, essential operating parameters when closing the package.

Time, equipment identification, key operating parameters when pasteurizing the product.

Information about storage (location, time of storage, retrieval, lower temperature, upper temperature, time average temperature).

Information about intermediate distribution points (when, where, transport modes, temperature information, if applicable).

Time of storage in the refrigerator according to the present disclosure

Information about the operation of the refrigerator (lower temperature, upper temperature, time average temperature).

Information about the removal from the refrigerator

As is usual for databases, those data records can be filtered out from the stored data records where the values stored in selectable rows of the data record lie within a selectable range.

The stored information not only enables the authenticity check already described, but also, in the event of disputes, typically in the case of alleged product defects, reliable proof as to whether high quality work was consistently carried out in the manufacture and distribution of the product.

For example, if a defect is detected in a single product that has arrived at an end customer, those products that were produced and distributed in the same time period with the same operating parameters can be identified. If the same defect or an indication of it is not discovered in any of these other products, this is a strong indication that the defect in the first-mentioned product arose in the area of responsibility of the end customer and not in the area of responsibility of the manufacturer or the distributor.

For example, even if the manufacturer or an intermediary subsequently becomes aware that there were problems in a certain time window at a certain processing plant or at a certain distribution station, the affected products can be identified and, to a large extent, also found, since the distribution structures are also stored and thus the locations at which the affected products are located can be narrowed down. At the latest when an affected product is detected in a refrigerator 1, which is part of the system according to the present disclosure, a warning can be transmitted to the control unit 7 at the refrigerator 1 by the database 9 for this purpose. Either via the local control unit 7 or via another more or less automated information path, personnel can also be informed so that they can prevent the delivery of this product.

Figure 2:
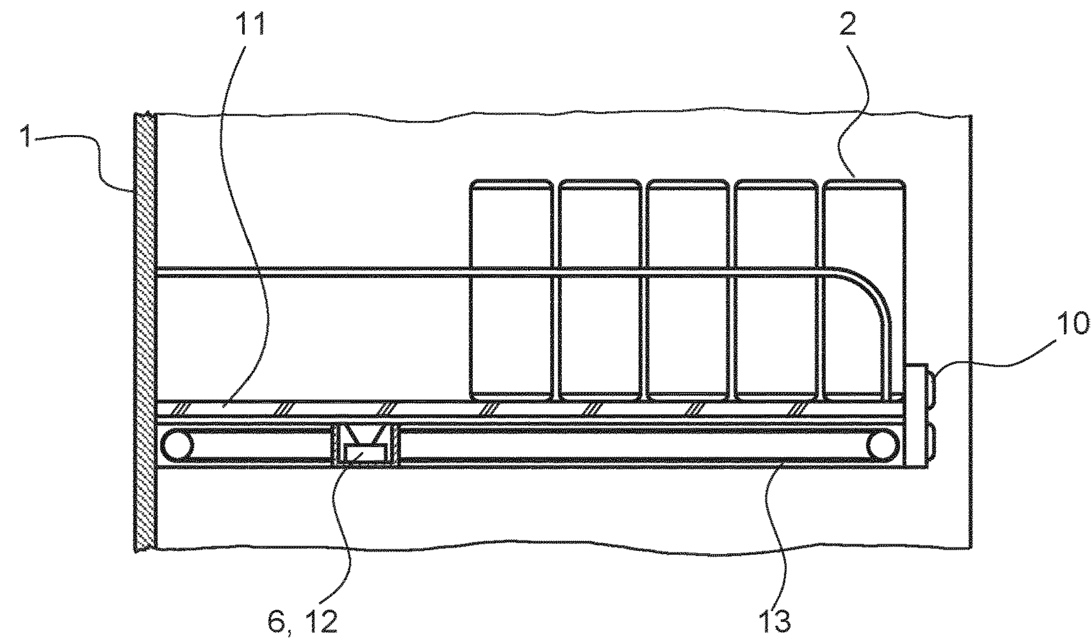
FIG. 2: shows a side sectional view of an exemplary refrigerator equipped with such a system.

According to FIG. 2, products 2, which may be beverage containers, are arranged on a transparent shelf surface 11 of a refrigerator 1 according to the present disclosure, with the door side of the refrigerator on the right. The detector 6 is located below the shelf surface 11. In this case, the detector 6 is formed as a camera bar 12 and a transport mechanism 13 moving this bar, similar to a flatbed scanner known from the office sector. According to the purpose, the camera bar 12 is moved by the transport mechanism 13 of a plane parallel to the shelf surface 11 during the image acquisition. Identification information for the products 2 is provided on the bottom surface of the products 2 according to this example. Typically, when the door of the refrigerator 1 has been closed, a scanning operation of the view of the transparent shelf surface 11 from below is performed, that is, the image of the transparent shelf surface 11 resulting from below is picked up by the camera bar 12. As is known per se for flatbed scanners, the camera bar 12 is typically a line scan camera, that is, its optical detector area is divided into small sub-areas which are threaded along a single line one after the other. For imaging a two-dimensional object, the camera bar 12 is shifted normal to its longitudinal direction, whereby recurring "one-dimensional" partial images are captured, which are then compiled by software to form a two-dimensional overall image. Preferably in the control and communication unit 7 (FIG. 1), the image information is evaluated to the extent that identifications 3 (FIG. 1) of the individual products 2 are identified and read. As described above, the read information is transmitted to the database 9 (FIG. 1) and information is received back confirming the authenticity of the individual products 2, if applicable. At the latest when the refrigerator door is opened, the signal element 10 is switched on for the product 2 closest to the door, so that its authenticity is signaled if necessary, or a warning is signaled in the opposite case. It is advantageous if the shelf surface 11 is provided with one of the devices known per se (not shown), which automatically pushes the products 2 located on the shelf surface 11 towards the removal side of the shelf surface 11.

The refrigerator 1 can also be part of a vending machine. In this case, the signaling by the signal element 10 must always relate to the product 2 currently being dispensed.

There are many modifications to the outlined embodiments within the scope of the inventive idea. Mentioned by way of example are:

The shelf surface does not need to be transparent over its entire depth, it is sufficient if its door-side area is transparent. The detector then only needs to capture images from below on the door-side area of the shelf surface.

In order to achieve the transparency of the shelf surface, it does not necessarily need to be made of a transparent material, such as glass. Instead, the control surface can also be formed from a coarse-meshed grid.

The optical detector located at the bottom of a shelf surface, which has a camera bar and a transport mechanism moving it in the manner of a flatbed scanner, can also be oriented downward so that it creates an image from above of those products that are located on the next lower shelf surface.

The products 2 can each be provided with an identification feature on their top side and on their bottom side, so that identification information on a product in the refrigerator 1 can be read both by a detector 6 picking up from above and by a detector picking up from below. This makes it possible, for example, to ensure that a product 2 can be correctly identified even if one of the two identification features has been damaged—for example scratched or covered over—in the course of handling. In addition, of course, counterfeit protection can also be increased, for example by using a different type of display or encryption for the information affixed at the top than for the information affixed at the bottom. The optical detector, which may be arranged on the underside of a shelf surface and which, in the manner of a flatbed scanner, has a camera bar and a transport mechanism moving the latter, can suitably have two camera bars, one directed downwards and the other upwards.

As known from the prior art for refrigerators per se, fixed cameras as well as cameras arranged on the movable refrigerator door can also be used as optical detectors.

The installation of an optical detector 6 described in FIG. 2 is particularly advantageous for the application according to the present disclosure, because it enables very well-defined images of the underside of product packaging to be taken—namely under precisely defined lighting conditions and at a constant short distance—so that even finely coded information can be reliably read.

Figure 3:
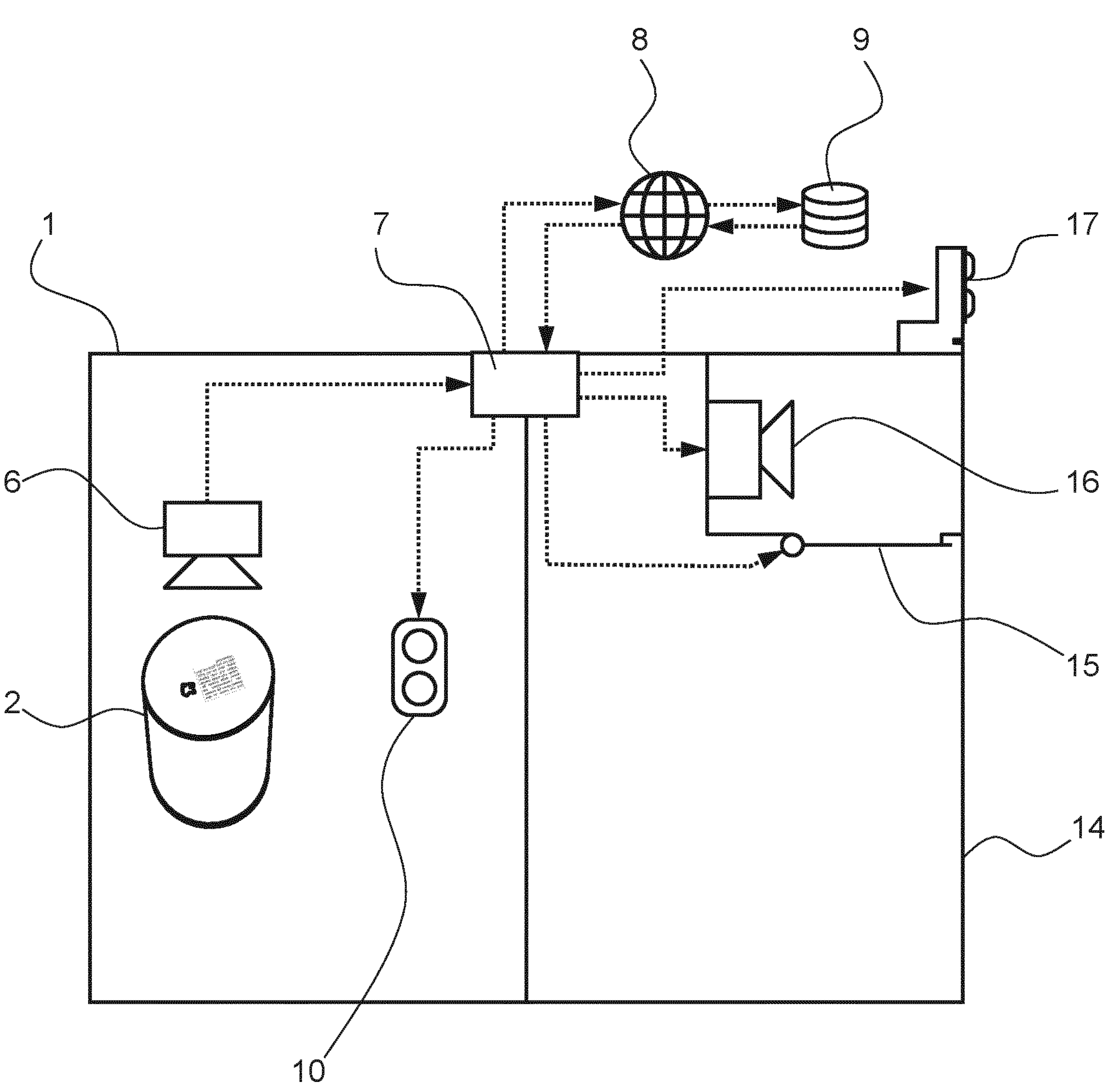
FIG. 3: shows a schematic representation of elements of a system for checking products combined with a device for the return of packaging.

FIG. 3 shows an apparatus which is an advantageous combination of a refrigerator 1 according to the present disclosure and a device 14 for taking back deposit packages, wherein the deposit packages are the packaging part of products 2, i.e., like the products 2 they also have an identification 3.

The device 14 for taking back deposit packages comprises a cavity for receiving the deposit packages and a controllable opening 15 through which a package can be inserted into the cavity if necessary. Furthermore, the device 14 comprises a further detector 16, which serves to detect identification information on deposit packages to be returned. Furthermore, the device 14 also comprises a signal and receipt output unit 17.

The control and communication unit 7 takes care of local elements in this case not only the elements detector 6 and signal element 10 present in the refrigerator 1, but also the elements: detector 16, controllable opening 15 and receipt issuing unit 17 belonging to the device 14 for taking back deposit packages.

When a suspected deposit container is held up to the detector 16 with its identification side first, the identification is detected and the relevant information is transmitted to the database 9 via the control and communication unit 7 and the information network 8. There, it is checked—as previously described for products 2—whether the deposit container is genuine and additionally whether a deposit has not yet been paid out for it. The result of the check is reported back to the control and communication unit 7. If both questions are answered 'yes', the controllable opening into the cavity is opened by the control and communication unit 7 so that the container falls into the cavity, and the signal and receipt issuing unit 17 is instructed to signal that the return has worked and to issue a corresponding receipt. (The issuance of a receipt need not necessarily be in paper form, it can also be done digitally by writing a credit to an account). If at least one of the aforementioned questions has been answered with 'No' by database 9, the acceptance of the deposit container and the issuing of a receipt will be refused.

In the positive case, it is stored in the database 9 that the deposit container was handed in and that a receipt was issued for it. This stored information can prevent the return deposit from being issued several times for the same packaging.

According to an advantageous further development, the detectors 6 used in the refrigerator 1 and the control and communication unit 7 as well as the information network 8 may also be used, in addition to the described uses according to the present disclosure, to inform authorized users of the refrigerator 1 with information about the contents of the refrigerator 1—as described at the beginning as prior art.

According to an advantageous modification, the refrigerator used according to the present disclosure is part of a vending machine. Accordingly, a device for paying for goods and a dispensing device for products contained in the refrigerator are provided, which cooperate in such a way that when a product has been paid for, it is dispensed automatically. Before or during dispensing, the product may be checked for authenticity as described. If the system also includes a device for taking back deposit packages, as described with reference to FIG. 3, the amount obtained by returning deposit packages can also be settled when paying for products to be dispensed.

According to a further development, the system also includes a detector for recognizing registered customers, for example by means of a customer card or an identification routine that runs by exchanging radio signals between the detector and the customer's smartphone. Then product purchases and returns of deposit containers can be assigned to individual customers and also individually assigned conditions for product costs, payment methods, bonuses, etc. can be taken into consideration for individual customers. The customer accounts, designed as an ordered collection of digital data records, can also be located in the database 9, for example, and the data transfer is ideally also carried out via the control and communication unit (7) and the associated information network (8) (FIG. 1, FIG. 3).

Figures 4, 5:
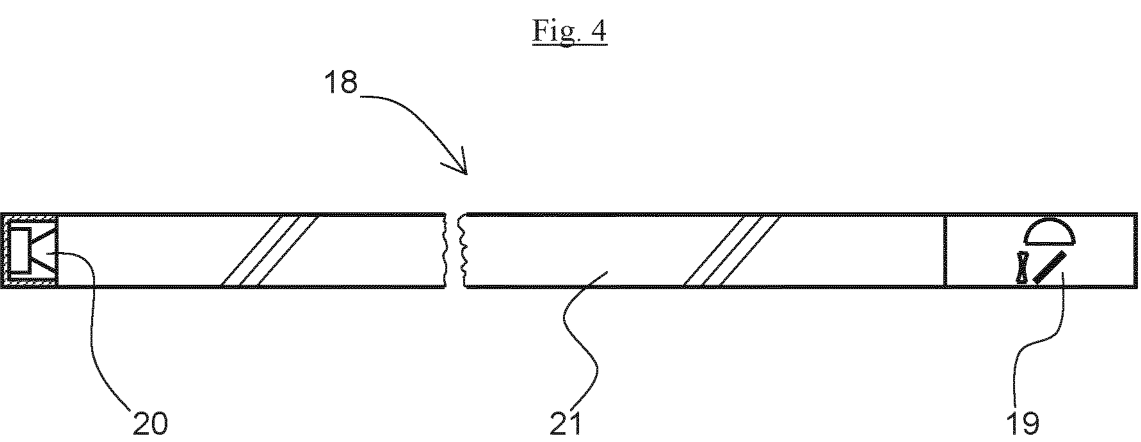
FIG. 4: shows a stylized representation of a first special shelf that is usable in embodiments disclosed herein, in a side partial sectional view.
FIG. 5: shows the shelf of FIG. 4 also somewhat stylized from above.

FIG. 4 and FIG. 5 illustrate a shelf surface 18 that can be used in accordance with embodiments described herein, in which a series of optical assemblies 19, a series of detectors 20, and an intervening light-transmitting region 21 are combined into a board-like structure ideally flush with the surface, so that they form a surface on which products 2 (according to the previous drawings) can be placed.

An optical assembly 19 includes lenses, and/or mirrors/and/or translucent prisms embedded in a light-conducting, protective medium. Their purpose is to focus light coming from the top of the shelf surface 18 and redirect it into a beam of light directed substantially parallel to the shelf surface, away from the removal side of the refrigerator. The beam then passes through the light transmission area 21, which may simply be formed by a flat glass plate, and ultimately reaches the detectors 20, which are typically small cameras and are arranged in a row side by side on the side of the shelf surface 18 opposite the optical assemblies 19. In accordance with the purpose, products 2 are placed on the shelf surface, and a product 2 located on the removal side stands exactly on an optical assembly 19, so that the underside of the product 2 is captured by the latter. It is advantageous to also arrange one or more light sources in the row of detectors 20, which send light via the light transmission area 21 and the optical assemblies 19 to the underside of the products standing on them, if necessary.

Shelf surfaces 18 according to FIGS. 4 and 5, and also the following discussed modifications thereto, are visually attractive and by their use a conventional refrigerator can be upgraded quite easily to a refrigerator with data collection regarding the products 2—even if the refrigerator is not used for checking the authenticity of the products 2 according to the present disclosure or for collecting distribution data regarding the products.

In addition to the discussed design according to FIG. 4 and FIG. 5, related designs are briefly mentioned:

- The light transmission from an optical assembly 19 to a detector 20 can also be accomplished via fibrous light guides arranged in or on a flat, mechanically supporting shelf area.
- An optical detector 20 can also be integrated directly in an optical assembly 19, and thus also be arranged underneath the respective product received. Preferably, cabling for the power supply and data transmission must then be attached to the underside of the remaining shelf surface.

Figure 6:
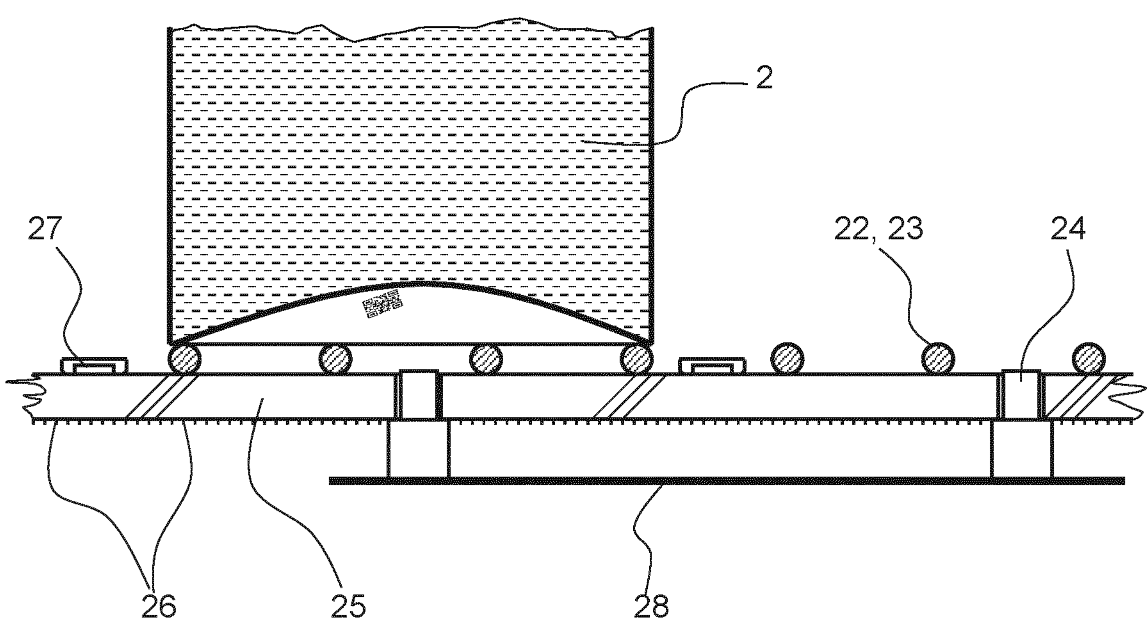
FIG. 6: shows a stylized representation of a second specific shelf that is usable in embodiments disclosed herein, shown in frontal partial sectional view including a product located on the shelf.

FIG. 6 shows a shelf 22 that can be used, which is realized by a grid of bars 23 extending horizontally, on the top of which the product 2 is placed. A plurality of detectors 24 is used, which in this case are stationary small optical cameras oriented upwardly, their field of view extending upwardly through the space between adjacent bars 23, to the underside of the product 2 which may be located there. The cameras representing the detectors 24 are in this case—as also in the case of the detectors 20 according to FIG. 4—so-called area cameras, i.e., "usual" cameras, whose optically sensitive layer is formed by a two-dimensional grid of individual optical sensor cells (so-called pixels).

When using optical detectors located in the close-up range of the surface to be detected, considerable difficulties often arise due to the fact that the surface of the object to be detected does not reflect light uniformly in a diffuse manner, but also reflects it to a considerable extent in an ordered manner, i.e., it mirrors it. As a result, there are always areas from which a kind of mirror image of the light source is reflected onto the detector surface. Analogous to the glare effect on the human eye, this often leads to the fact that the structure to be detected cannot be recognized because the contrasts in the structure to be detected are much lower than the contrasts between surface areas from which a mirror image of the light source is reflected onto the detector and those surface areas from which light is only diffusely scattered onto the detector. Such disturbing effects are particularly strong when concave curved sheet metal surfaces—such as those found on the underside of beverage cans—are to be imaged. FIG. 6 illustrates a very innovative method of illumination which helps to solve this problem:

On the underside of the substantially transparent shelf surface 22, parallel thereto, is a pane 25 which is made of a transparent material such as typically clear glass or clear acrylic glass. At least one of the two surfaces of the pane 25 parallel to the plane of the pane is provided with a grid of surface pieces 26 which diffusely reflect incoming light. These surface pieces 26 may be formed by a coating of a diffusely reflecting material applied in small areas or by rough areas of the pane surface. Rough areas of the pane surface may be formed by chemical etching or by mechanical processing or by laser treatment of a previously smooth pane surface. The surface of the pane, which is not formed as diffuse reflective surface pieces 26, is formed to be flat, smooth, and translucent, as is the case with conventional clear glass surfaces. For example, one side of the pane 25 may have no diffusely reflecting surface pieces 26 at all, and on the second side of the pane a total of 10% of the surface is provided with diffusely reflecting surface pieces 26.

Light sources 27 are affixed to partial surfaces of the pane 25, which radiate light into the volume of the pane 25. In the advantageous case shown, only one side of the pane 25 has reflective surface pieces 26, and the light sources 27 lie against the opposite side of the pane 25. However, it would also be possible to couple light into the pane 25 from its front sides.

With this design, it is achieved that the pane 25 emits light like an extremely large-area, extremely uniformly diffused light source and thus illuminates the underside of the possibly present product 2. The optical detector 24 located underneath the product 2 can thus record an image of this underside which is not disturbed by partial surface areas which are overexposed by reflection.

Mainly because of the better protection against dirt, preferably only the lower side of the pane is provided with diffuse reflecting surface pieces 26.

As outlined, the electronic supply assembly 28—which may include, for example, a circuit board and electrical lines for power supply and a line connection for data transmission—is located on the underside of the pane 25.

In addition, the pane 25 is preferably perforated at those points where an optical detector 24 is located, so that the direct light path from the surface of the product to be imaged to the light incident surface of the optical detector 24 does not pass through material of the pane 25.

According to a modification of the design of FIG. 6, the shelf surface on which the product 2 is supported is formed by a transparent glass pane and the pane 25, which serves for illumination and is provided with diffusely reflecting surface pieces 26, is located below this supporting pane.

According to a further modification of the design of FIG. 6, the pane 25, which serves for illumination and is provided with diffusely reflecting surface pieces 26, is at the same time that shelf surface which supports the product 2 and on the upper side of which the product 2 stands. In this case, it is particularly important that the diffusely reflecting surface pieces 26 are located on the underside of the pane 25.

The design discussed in FIG. 6, as well as the modifications discussed in this context, can be used advantageously in general—i.e., not only within a system for checking the authenticity of products—to detect goods standing on a shelf surface from below by means of an optical detector.

The invention claimed is:

1. A system for checking the authenticity of a product, according to which the product is provided with an identification, the information of which is read out by a detector and is transmitted to a database via a control and communication unit which controls the detector and a signal element, and an information network connected to the control and communication unit and is compared with information stored there, wherein a decision regarding the authenticity or inauthenticity of the product is generated as a result of the comparison and the result of this decision is signaled at the location of the product by the signal element, wherein the product is a packaged foodstuff and the detector is arranged in a refrigerator in which the product is placed, wherein the refrigerator has a transparent shelf surface, and the detector is an optical detector and captures images of the products located on the shelf surface from the underside, through the shelf surface, wherein the detector comprises a camera bar arranged below the shelf surface and movable by a transport mechanism substantially parallel to a plane of the shelf surface, and wherein a pane consisting of transparent material extends parallel to the plane of the shelf surface, wherein the pane includes two surfaces each lying parallel to a plane of the pane, wherein at least one of the two surfaces of the pane is provided with a grid of surface pieces which diffusely reflects incoming light, wherein regions of the surfaces of the pane not provided with the surface pieces are formed to be flat, smooth and translucent, and wherein one or more light sources radiate light into the material of the pane.

2. The system according to claim 1, wherein it is noted in the database from which control and communication unit which information from identifications was transmitted and when.

3. The system according to claim 1, wherein the refrigerator has a shelf surface in which the detector, which is designed as an optical detector, is integrated flush with the surface.

4. The system according to claim 3, wherein an optical assembly is integrated flush with the shelf surface, the optical assembly directing light from the top of the shelf surface to the detector.

5. The system according to claim 4, wherein the light transmission between the optical assembly and the detector is carried out via a light-conducting solid body.

6. The system according to claim 1, wherein the pane is arranged below the shelf surface.

7. The system according to claim 1, wherein the pane itself is the shelf surface.

8. The system according to claim 1, wherein the diffusely reflecting surface pieces are located on the lower surface of the pane, a supply assembly for the detector is located below the pane, and the pane is perforated at the location where the detector is located.

9. The system according to claim 1, wherein detector, control and communication unit and information network are also used to provide authorized users of the refrigerator with information about the contents of the refrigerator.

10. The system according to claim 1, wherein the information network is the Internet.

11. The system according to claim 1, wherein, in the database, data records are generated which contain data relating to manufacturing parameters for the products marked with individual identifications.

12. The system according to claim 1, wherein, in the database, data records are generated which contain data relating to individual manufacturing steps for the products marked with individual identifications.

13. The system according to claim 1, wherein, in the database, data records are generated which contain data relating to the distribution channel for the products marked with individual identifications.

14. The system according to claim 1, wherein the identification on the product is affixed to both its upper side and its lower side, and each of the two identifications can be read out in the refrigerator.

15. A system for checking the authenticity of a product, according to which the product is provided with an identification, the information of which is read out by a detector and is transmitted to a database via a control and communication unit which controls the detector and a signal element, and an information network connected to the control and communication unit and is compared with information stored there, wherein a decision regarding the authenticity or inauthenticity of the product is generated as a result of the comparison and the result of this decision is signaled at the location of the product by the signal element, wherein the product is a packaged foodstuff and the detector is arranged in a refrigerator in which the product is placed, wherein the refrigerator is combined with a device for taking back deposit packages, the deposit packages being the packaging part of products provided with the identification, the device comprising a detector which reads the identification, the information from which is transmitted to the database via a control and communication unit, which controls the detector and a signal element, and via the information network, and by comparing data stored in the database a decision is generated as to whether the deposit packaging is genuine and whether a deposit has not already been paid out for it.

16. The system according to claim 12, wherein, after identification of the product in the refrigerator on the basis of the identification and fulfillment by the database of filter conditions stored in the database, a warning against use of the product and/or product recall information relating to the product can be generated and transmitted to the control and communication unit in the refrigerator.

17. A system for checking the authenticity of a product, according to which the product is provided with an identification, the information of which is read out by a detector and is transmitted to a database via a control and communication unit which controls the detector and a signal element, and an information network connected to the control and communication unit and is compared with information stored there, wherein a decision regarding the authenticity or inauthenticity of the product is generated as a result of the comparison and the result of this decision is signaled at the location of the product by the signal element, wherein the product is a packaged foodstuff and the detector is arranged in a refrigerator in which the product is placed, wherein the refrigerator is part of a vending machine, wherein a detector for recognizing registered customers is present in the area of the refrigerator, one or more product purchases and, if applicable, one or more deposit returns are assigned to the respective accounts of respectively recognized customers, and the exchange of information between a database containing the customer accounts and the detector for recognizing registered customers takes place via the control and communication unit and the information network connected thereto.

18. A system for optically identifying products on a transparent shelf surface from above, comprising:

an optical detector located below the products;

a pane consisting of transparent material extending parallel to a plane of the shelf surface, wherein the pane includes two surfaces each lying parallel to a plane of the pane, wherein at least one of the two surfaces of the pane is provided with a grid of surface pieces which diffusely reflects incoming light, and wherein regions of the surfaces of the pane not provided with the surface pieces are formed to be flat, smooth and translucent; and one or more light sources that radiate light into the material of the pane, wherein the diffusely reflecting surface pieces are located on a lower one of the surfaces of the pane, a supply assembly for the detector is located below the pane, and the pane is perforated at the location where the detector is located.

* * * * *